United States Patent
Lahr et al.

(10) Patent No.: US 10,166,975 B2
(45) Date of Patent: Jan. 1, 2019

(54) TRANSMISSION WITH TORQUE CONVERTER DISCONNECT CLUTCH AND ENGINE BRAKING FRICTION CLUTCH

(71) Applicant: GM GLOBAL TECHNOLOGY OPERATIONS LLC, Detroit, MI (US)

(72) Inventors: Derek F. Lahr, Howell, MI (US); Chunhao J. Lee, Troy, MI (US); Farzad Samie, Franklin, MI (US); Dongxu Li, Troy, MI (US); Dmitriy Bruder, Auburn Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 147 days.

(21) Appl. No.: 15/387,697

(22) Filed: Dec. 22, 2016

(65) Prior Publication Data

US 2018/0178778 A1    Jun. 28, 2018

(51) Int. Cl.
| | |
|---|---|
| *B60W 20/40* | (2016.01) |
| *B60K 6/387* | (2007.10) |
| *F16D 47/04* | (2006.01) |
| *F16H 41/24* | (2006.01) |
| *F16H 45/02* | (2006.01) |

(Continued)

(52) U.S. Cl.
CPC .............. *B60W 20/40* (2013.01); *B60K 6/387* (2013.01); *F16D 21/00* (2013.01); *F16D 47/04* (2013.01); *F16H 41/24* (2013.01); *F16H 45/02* (2013.01); *F16H 61/143* (2013.01); *B60Y 2200/92* (2013.01); *B60Y 2300/421* (2013.01); *B60Y 2300/425* (2013.01); *B60Y 2400/426* (2013.01); *B60Y 2400/427* (2013.01); *F16H 2041/246* (2013.01); *Y10S 903/946* (2013.01)

(58) Field of Classification Search
CPC ........ B60W 20/40; B60K 6/387; F16D 47/04; F16H 41/24; F16H 45/02; F16H 2041/246; B60Y 2200/92; B60Y 23/452; B60Y 23/425; B60Y 24/426; B60Y 24/427; Y10S 903/946
See application file for complete search history.

(56) References Cited

U.S. PATENT DOCUMENTS 2,858,675 A * 11/1958 Schneider ............... F16H 61/60
                                                                                    188/296
6,374,972 B1 * 4/2002 Yoshimoto ............... B62M 7/02
                                                                                    192/103 A

(Continued)

*Primary Examiner* — Jacob S. Scott
*Assistant Examiner* — Tinh Dang
(74) *Attorney, Agent, or Firm* — Quinn IP Law (57) ABSTRACT

A transmission includes a housing, and a transmission input member. A torque converter includes a pump and a turbine. The turbine of the torque converter is connected to the transmission input member. A lock-up clutch selectively connects the pump and the turbine. A cover is connected to and rotatable with the pump. The cover at least partially defines an interior of the torque converter. A torque converter input member passes through the cover. A one way clutch interconnects the torque converter input member and the cover. An engine brake friction clutch is disposed within the interior of the torque converter. The engine brake friction clutch selectively interconnects the torque converter input member and the cover in torque communication to transfer a braking torque therebetween.

19 Claims, 4 Drawing Sheets

(51) Int. Cl.
*F16H 61/14* (2006.01)
*F16D 21/00* (2006.01)

(56) References Cited

U.S. PATENT DOCUMENTS

| | | | | |
|---|---|---|---|---|
| 6,386,067 | B1* | 5/2002 | Inoue | F16H 45/02 |
| | | | | 74/730.1 |
| 6,508,345 | B1* | 1/2003 | Yoshimoto | F16H 3/16 |
| | | | | 192/105 R |
| 2001/0025754 | A1* | 10/2001 | Yoshimoto | B62M 7/02 |
| | | | | 192/3.25 |
| 2008/0271966 | A1* | 11/2008 | Simpson | F16H 61/62 |
| | | | | 192/3.33 |
| 2011/0214958 | A1* | 9/2011 | Sturgin | F16D 21/08 |
| | | | | 192/3.25 |
| 2012/0021869 | A1* | 1/2012 | Robinette | F16D 25/0638 |
| | | | | 477/6 |
| 2013/0081916 | A1* | 4/2013 | Waters | F16H 45/02 |
| | | | | 192/3.25 |
| 2013/0284554 | A1* | 10/2013 | Ideshio | B60K 6/26 |
| | | | | 192/3.28 |
| 2013/0306423 | A1* | 11/2013 | Ideshio | F16H 41/30 |
| | | | | 192/3.29 |
| 2014/0256506 | A1* | 9/2014 | Ideshio | F16H 41/24 |
| | | | | 477/5 |

* cited by examiner

TRANSMISSION WITH TORQUE CONVERTER DISCONNECT CLUTCH AND ENGINE BRAKING FRICTION CLUTCH

The disclosure generally relates to a transmission for a hybrid vehicle, and a method of controlling the transmission.

Vehicles may use a transmission to reduce the rotational speed of a crankshaft of an internal combustion engine while increasing torque, while transferring the torque from the internal combustion engine to a final drive. Hybrid vehicles incorporate an alternative power source for supplying torque to one or more wheels of the vehicle. In some configurations, the alternative power source includes an electric motor/generator unit or other similar device that provides torque directly to a component of the transmission. The torque form the electric motor/generator unit may be used in combination with the torque from the internal combustion engine, or as an alternative to the torque from the internal combustion engine. Some operating modes of some types of hybrid vehicles require that torque communication between the internal combustion engine and the transmission be disconnected so that no torque may flow between the engine and the transmission while the electric motor/generator unit is connected to the transmission.

SUMMARY

A transmission for a vehicle is provided. The transmission includes a housing, and a transmission input member that is rotatably supported by the housing. A torque converter includes a pump and a turbine. The turbine of the torque converter is connected to the transmission input member for transferring torque therebetween. A cover is connected to and rotatable with the pump. The cover at least partially defines an interior of the torque converter. A torque converter input member passes through the cover. The torque converter input member is configured for attachment to a crankshaft of an engine. A one way clutch interconnects the torque converter input member and the cover. An engine brake friction clutch is disposed within the interior of the torque converter. The engine brake friction clutch selectively interconnects the torque converter input member and the cover in torque communication.

In one aspect of the transmission, the engine brake friction clutch is controlled to either an engaged position or a disengaged position. When controlled to the engaged position, the engine brake friction clutch communicates torque between the torque converter input member and the cover. The engine brake friction clutch is operable to communicate a braking torque between the cover and the torque converter input member. When controlled to the disengaged position, the engine brake friction clutch does not communicate torque between the torque converter input member and the cover.

In one embodiment of the transmission, a seal is disposed between and in sealing engagement with the cover and the torque converter input member. A bushing or bearing may be disposed between the cover and the torque converter input member, so that the bushing radially supports the cover relative to the torque converter input member.

In another aspect of the transmission, the transmission includes a lock-up clutch that is selectively operable to connect the pump and the turbine for rotation together without relative slippage therebetween.

In another aspect of the transmission, the one way clutch is operable to communicate a drive torque from a prime mover, such as an internal combustion engine, between the torque converter input member and the cover. The one way clutch is operable to communicate torque between the torque converter input member and the cover in a first rotational direction without slippage therebetween, and wherein the one way clutch is operable to not communicate torque between the torque converter input member and the cover in a second rotational direction, opposite the first rotational direction. In one embodiment of the transmission, the one way clutch is disposed within the interior of the torque converter.

In another aspect of the transmission, an electric device is coupled to the pump. The electric device is operable to supply torque to the pump.

In another aspect of the transmission, the transmission includes a control system that is operable to send a control signal to the engine brake friction clutch to move the engine brake friction clutch between its engaged position and its disengaged position. The control system may include a hydraulic control system for controlling the transmission. The hydraulic control system includes a first fluid circuit, a second fluid circuit, and an exhaust fluid circuit. The first fluid circuit supplies a first fluid control signal at a first fluid pressure to an apply side of the lock-up clutch. The second fluid circuit supplies a second fluid control signal at a second fluid pressure to a release side of the lock-up clutch and to an apply side of the engine brake friction clutch. The exhaust fluid circuit exhausts fluid from a release side of the engine brake friction clutch. The engine brake friction clutch is controlled between its engaged position and its disengaged position by the second fluid pressure of the second fluid control signal.

A method of controlling a transmission of a hybrid vehicle is also provided. The transmission includes a torque converter having a pump and a turbine, a torque converter input member connected to a crankshaft of an engine and passing through a cover of the pump into an interior of the torque converter, a lock-up clutch selectively interconnecting the pump and the turbine, and an engine brake friction clutch disposed within the interior of the torque converter and selectively interconnecting the cover and the torque converter input member. The method of controlling the transmission includes providing a hydraulic control system for controlling the transmission. The hydraulic control system includes a first fluid circuit, a second fluid circuit, and an exhaust fluid circuit. The first fluid circuit supplies a first fluid control signal to an apply side of the lock-up clutch at a first fluid pressure. The second fluid circuit supplies a second fluid control signal to a release side of the lock-up clutch, and an apply side of the engine brake friction clutch at a second fluid pressure. The exhaust fluid circuit exhausts fluid from a release side of the engine brake friction clutch at an exhaust fluid pressure. The operation of the engine brake friction clutch is controlled by varying the first fluid pressure of the first fluid control signal and the second fluid pressure of the second fluid control signal used to control the lock-up clutch.

In one aspect of the method of controlling the transmission, the operation of the engine brake friction clutch is controlled by controlling the first fluid pressure to be greater than the second fluid pressure, while maintaining the second fluid pressure at a fluid pressure that is greater than the exhaust fluid pressure. By so doing, the lock-up clutch is engaged to connect the pump and the turbine, and the engine brake friction clutch is engaged to communicate torque between the cover of the pump and the torque converter input member.

In one aspect of the method of controlling the transmission, the operation of the engine brake friction clutch is controlled by controlling the first fluid pressure to be less than the second fluid pressure. By so doing, the lock-up clutch is disengaged to disconnect the pump and the turbine, and the engine brake friction clutch is engaged to communicate torque between the cover of the pump and the torque converter input member.

In one aspect of the method of controlling the transmission, the operation of the engine brake friction clutch is controlled by controlling the first fluid pressure to be greater than the second fluid pressure, and connecting the second fluid control signal with the exhaust fluid circuit so that the second fluid pressure is equal to the exhaust fluid pressure. By so doing, the lock-up clutch is engaged to connect the pump and the turbine, and the engine brake friction clutch is disengaged to not communicate torque between the cover of the pump and the torque converter input member.

In another aspect of the method of controlling the transmission, the transmission includes a one way clutch that interconnects the cover of the pump and the torque converter input member. The one way clutch communicates torque between the cover of the pump and the torque converter input member in a first rotational direction, and does not communicate torque between the cover of the pump and the torque converter input member in a second rotational direction. The method of controlling the transmission further includes controlling the engine brake friction clutch into an engaged position, to provide an engine braking torque to the cover, when torque is applied to the torque converter input member in the second rotational direction.

In another aspect of the method of controlling the transmission, the transmission includes an electric device connected to the pump of the torque converter. The electric device is operable to apply torque to the pump. The method of controlling the transmission further includes controlling the engine brake friction clutch into an engaged position, to provide an engine braking torque to the cover, when torque is applied to the pump with the electric device. In another aspect of the method of controlling the transmission, the engine brake friction clutch is controlled into a disengaged position, to disconnect torque communication between the pump and cover, when torque is applied to the pump with the electric device.

Accordingly, the one way clutch allows the torque converter input member, which may be connected to a crankshaft of an internal combustion engine, to over spin. The engine brake friction clutch enables an engine braking torque to be applied to ensure that any negative torque during engine torsionals does not disengage the one way clutch. This combination enables the electric device to be directly connected to the pump of the torque converter, as well as allow the use of engine braking, for example, during downhill descent.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Figure 1:
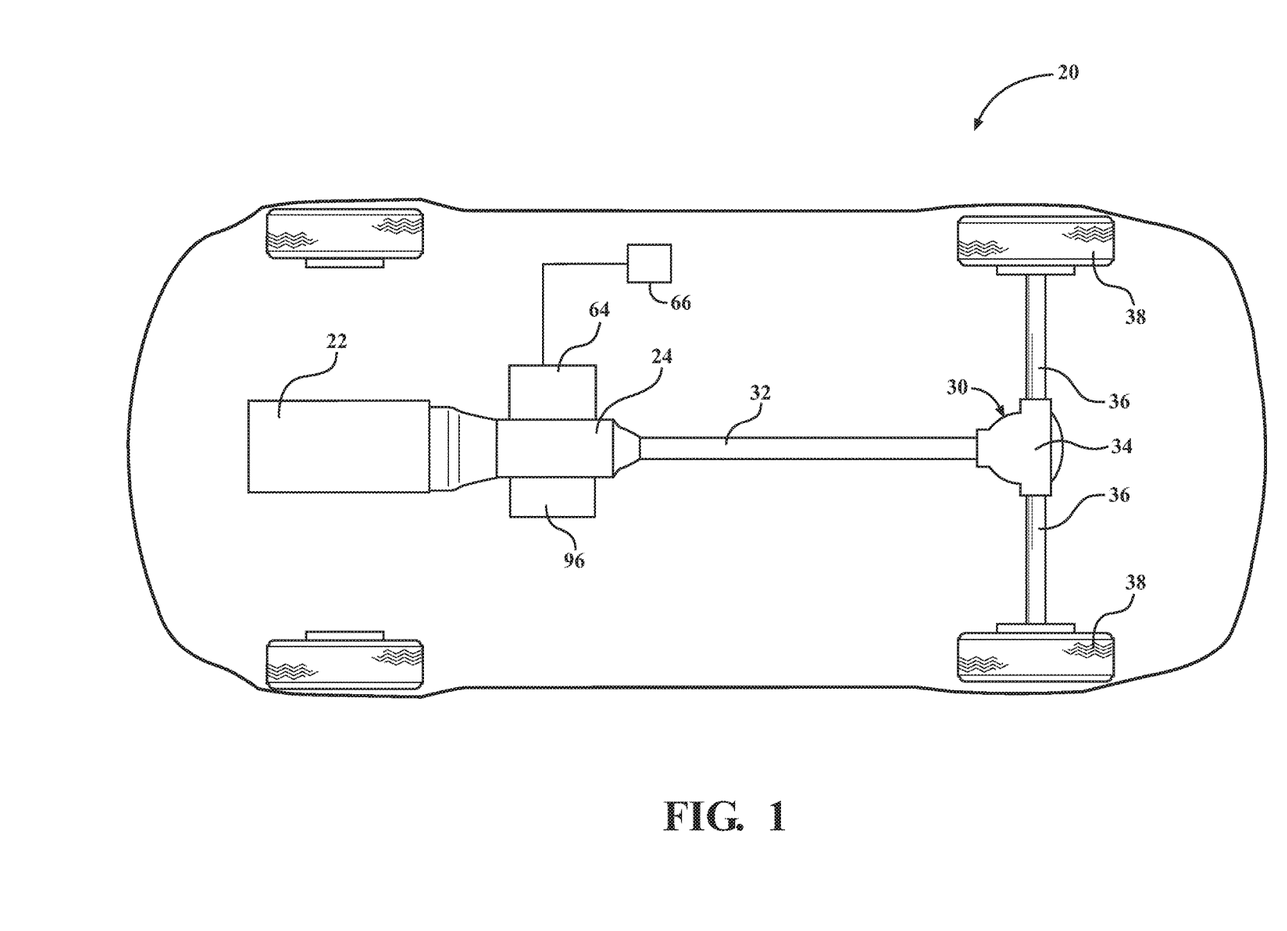
FIG. 1 is a schematic plan view of a vehicle.

Referring to the FIGS., wherein like numerals indicate like parts throughout the several views, a vehicle is generally shown in FIG. 1 at 20. Referring to FIG. 1, the vehicle 20 may include any moveable platform, such as but not limited to a car, truck, tractor, etc. The vehicle 20 includes a prime mover 22 that is connected to a transmission 24. The prime mover 22 may include any torque generating device, such as but not limited to an internal combustion engine. The prime mover 22 includes an output 26, such as a crankshaft, which rotates about an axis 28 and supplies torque to the transmission 24. The specific type, configuration and operation of the prime mover 22 are not pertinent to the teachings of this disclosure, and are therefore not described in detail herein.

The transmission 24 transfers the torque from the prime mover 22 to a final drive 30 system. The final drive 30 system may include, but is not limited to, a drive shaft 32, a differential 34, an axle 36 and at least one drive wheel 38. The specific type, configuration and operation of the final drive 30 are not pertinent to the teachings of this disclosure, and are therefore not described in detail herein.

Figure 2:
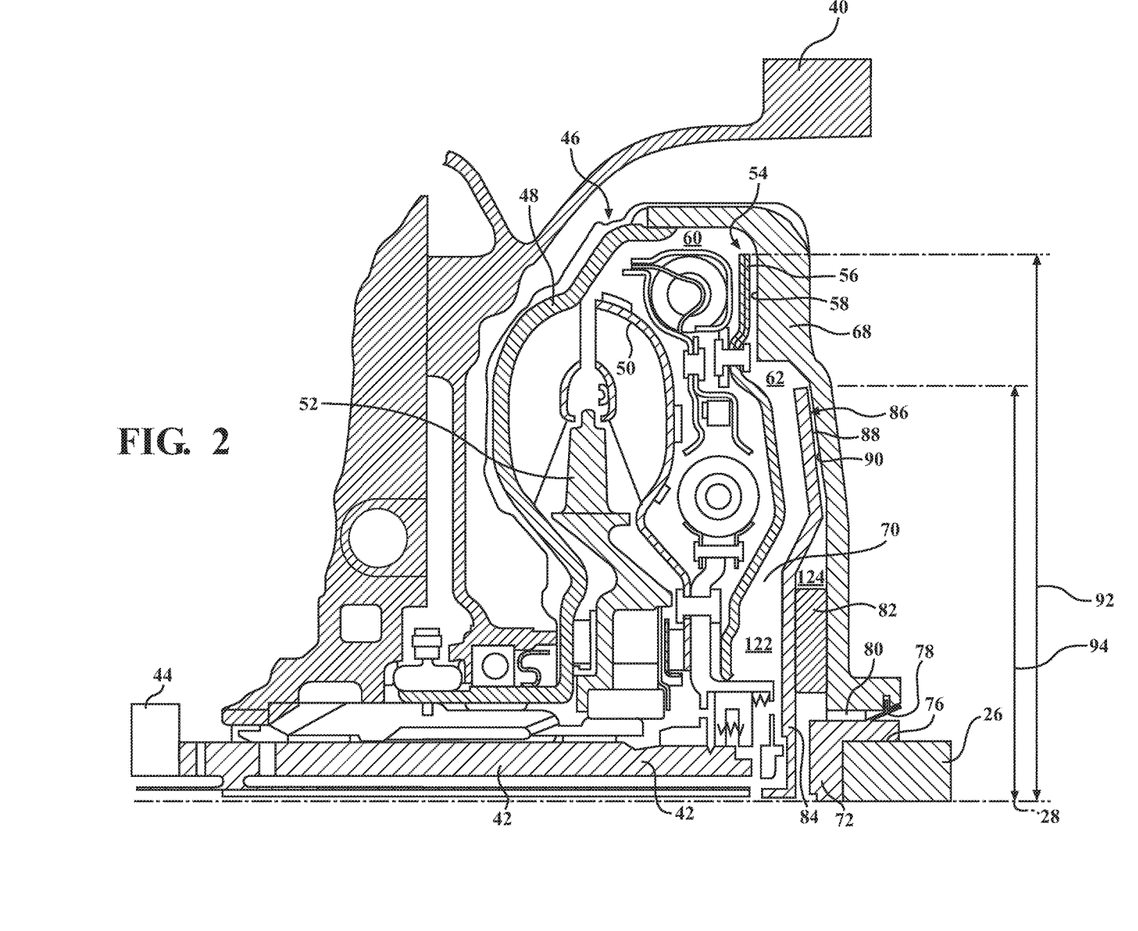
FIG. 2 is a schematic half cross sectional view of a transmission.

Referring to FIG. 2, the transmission 24 includes a housing 40. The housing 40 supports the various components of the transmission 24. The housing 40 may be configured in any suitable size and/or shape to fit the specific application. The housing 40 may be attached to the prime mover 22. For example, the housing 40 of the transmission 24 may be bolted to an engine block of an internal combustion engine as is known.

The housing 40 rotatably supports a transmission input member 42. A gear train 44 is supported by the housing 40, and is connected to the transmission input member 42. The transmission input member 42 receives torque from the prime mover 22, via a torque converter 46, described in greater detail below. The transmission input member 42 transfers the torque to the gear train 44. The gear train 44 may include any gearing system. For example, the gear train 44 may include, but is not limited to, any style and configuration of gear train 44 that is capable of reducing the rotational speed of the transmission input member 42 while simultaneously increasing torque output 26. The specific type, configuration and operation of the gear train 44 is not pertinent to the teachings of this disclosure, and are therefore not described in detail herein.

As noted above, the transmission 24 includes the torque converter 46, which is a fluid coupling for transferring the torque from the prime mover 22 to the transmission input member 42. The torque converter 46 includes a pump 48 and a turbine 50. The turbine 50 is connected to and rotatable with the transmission input member 42 for transferring torque therebetween. The turbine 50 may be connected to the transmission input member 42 by any suitable means, such as but not limited to through a splined interlocking connection, such as shown in FIG. 2. The pump 48 is rotatably supported by the housing 40, for rotation about a central longitudinal axis 28 of the transmission input member 42. The torque converter 46 may further include a stator 52 disposed between the pump 48 and the turbine 50, and supported by the housing 40.

In the exemplary embodiment shown in the Figures and described herein, the torque converter 46 includes a lock-up clutch 54, often referred to as a torque converter 46 clutch. The lock-up clutch 54 is selectively operable to connect the pump 48 and the turbine 50 for rotation together. The lock-up clutch 54 may be controlled so that the pump 48 and the turbine 50 rotate together without any relative slippage therebetween, providing a direct 1:1 communication between rotation of the output 26 from the prime mover 22 and rotation of the transmission input member 42. In other embodiments, the lock-up clutch 54 may be controlled to provide a desired amount of relative slippage between the pump 48 and the turbine 50. The lock-up clutch 54 may include, but is not limited to, a hydraulically actuated friction clutch, in which a first friction member 56 is attached to the turbine 50, and a second friction member 58 is attached to the pump 48. Hydraulic pressure is applied to an apply side 60 of the lock-up clutch 54 to bias the first friction member 56 and the second friction member 58 together in frictional engagement, thereby providing the connection between the turbine 50 and the pump 48. Hydraulic pressure applied to a release side 62 of the lock-up clutch 54 biases the first friction member 56 and the second friction member 58 apart, thereby disengaging the frictional engagement therebetween, and allowing the pump 48 and the turbine 50 to rotate independently of each other. It should be appreciated that the lock-up clutch 54 may be configured and operate differently than the exemplary embodiment shown in the Figures and described herein.

Referring to FIG. 1, the transmission 24 may further include an electric device 64. The electric device 64 provides torque to the transmission 24. The electric device 64 may be controlled to apply torque to the transmission 24 in combination with the prime mover 22, or as an alternative power source to the prime mover 22. In the exemplary embodiment shown and described herein, the electric device 64 is coupled to the pump 48 of the torque converter 46, and is operable to supply torque to the pump 48. The electric device 64 may be coupled to the pump 48 in any suitable manner. For example, the electric device 64 may be coupled to a central hub of the pump 48 via a belt, chain, gear train 44, etc. The electric device 64 may be coupled to the pump 48 in any manner that allows the electric device 64 to deliver torque to the pump 48, and/or receive torque from the pump 48.

The electric device 64 may include any device that is capable of providing torque to the pump 48 of the torque converter 46. Additionally, the electric device 64 may be capable of receiving torque from the pump 48, and transforming that torque into some other form of energy, such as stored electrical energy. In one embodiment, the electric device 64 is an electric motor/generator unit, which is coupled to an energy storage device 66, such as but not limited to a battery. The electric motor/generator unit draws electrical power from the energy storage device 66 and converts that electrical power to torque, which may then be supplied to the pump 48 of the torque converter 46. The motor/generator unit may also receive torque from the pump 48 and convert that torque into electrical energy, which may then be stored in the energy storage device 66 for later use. However, it should be appreciated that the electric device 64 may include some other type and/or configuration of device. The specific type, configuration and operation of the electric device 64 are not pertinent to the teachings of this disclosure, and are therefore not described in detail herein.

Referring to FIG. 2, the transmission 24 further includes a cover 68. The cover 68 is connected to and rotatable with the pump 48. It should be appreciated that the cover 68 may be a separate component that is affixed to the pump 48, or alternatively, may be integrally formed with the pump 48. The cover 68 at least partially defines an interior 70 of the torque converter 46. More specifically, the pump 48 and the cover 68 cooperate to define the interior 70 of the torque converter 46. The turbine 50, the stator 52, and the lock-up clutch 54 are all disposed within the interior 70 of the torque converter 46.

A torque converter input member 72 passes through the cover 68. As such, at least a portion of the torque converter input member 72 is disposed within the interior 70 of the torque converter 46. The torque converter input member 72 is configured for attachment to the output 26 of the prime mover 22. For example, the torque converter input member 72 may be attached to a crankshaft of an internal combustion engine. As shown in the Figures, the exemplary embodiment of the transmission 24 includes a splined connection 76 between an axial end of the torque converter input member 72 and the output 26 of the prime mover 22. It should be appreciated that the torque converter input member 72 may be connected to the output 26 of the prime mover 22 in some other manner, and by some other intervening component. For example, a flexplate or a flywheel (not shown) may be connected to the output 26 of the prime mover 22, with the torque converter input member 72 connected to the flexplate. Noticeably, the transmission 24 is characterized by the lack of a direct mechanical connection between the cover 68 and a flexplate. More specifically, it is the torque converter input member 72 that is connected to the output 26 of the prime mover 22, such as for example, via a flexplate. Noticeably, the torque converter input member 72 is not permanently affixed to the cover 68 for non-interrupted torque communication therebetween.

The transmission 24 may further include a seal 78 disposed between and in sealing engagement with the cover 68 and the torque converter input member 72. The seal 78 may include any type and/or style of annular seal 78 for sealing around and between two annular components that rotate relative to each other. Additionally, the transmission 24 may further include a bushing 80 disposed between the cover 68 and the torque converter input member 72. The bushing 80 radially supports the cover 68 relative to the torque converter input member 72. The bushing 80 may include any device that is capable of radially supporting the cover 68 relative to the torque converter input member 72, such as but not limited to a steel or other similar style of bushing 80.

The transmission 24 includes a one way clutch 82 that interconnects the torque converter input member 72 and the cover 68. The one way clutch 82 is operable to communicate a drive torque, from the prime mover 22, between the torque converter input member 72 and the cover 68. The one way clutch 82 is operable to communicate torque between the torque converter input member 72 and the cover 68 in a first rotational direction without slippage therebetween. The one way clutch 82 is operable to not communicate torque between the torque converter input member 72 and the cover 68 in a second rotational direction, which is opposite the first rotational direction. Accordingly, the one way clutch 82 transmits torque in the first rotational direction, and allows the cover 68 and the pump 48 to freewheel relative to the torque converter input member 72 in the second rotational direction. The one way clutch 82 may include any device that is capable of transmitting torque in the first rotational direction, and not transmitting torque in the second rotational direction. The one way clutch 82 may further include a selectable one way clutch that may be controlled to a first state that does not transmit torque in either rotational direction, and may be controlled to a second state that transmits torque in only one rotational direction while not transmitting torque in the opposite rotational direction.

In the exemplary embodiment shown in the Figures and described herein, the one way clutch 82 is disposed within the interior 70 of the torque converter 46. This enables the hydraulic fluid within the interior 70 of the torque converter 46 to lubricate the one way clutch 82. The torque converter input member 72 may include a radially extending flange 84 disposed within the interior 70 of the torque converter 46, with the one way clutch 82 disposed between the flange 84 of the torque converter input member 72 and an interior 70 surface of the cover 68. However, in other embodiments of the transmission 24, the one way clutch 82 may be positioned on the exterior of the torque converter 46.

The transmission 24 further includes an engine brake friction clutch 86 that is disposed within the interior 70 of the torque converter 46. The engine brake friction clutch 86 selectively interconnects the torque converter input member 72 and the cover 68 in torque communication. For example, as shown in the Figures, the exemplary embodiment of the transmission 24 includes a third friction member 88 attached to the flange 84 of the torque converter input member 72, and a fourth friction member 90 attached to the cover 68. An axial force applied to an apply side 122 of the engine braking friction clutch connects the third friction member 88 and the fourth friction member 90 in torque communication to communicate a braking torque therebetween.

In the exemplary embodiment of the transmission 24 shown in the Figures, the lock-up clutch 54 defines a lock-up outer diameter 92, and the engine brake friction clutch 86 defines a brake outer diameter 94. It should be appreciated that FIG. 2 only shows half of the transmission 24, cut along the central axis 28 of the transmission input member 42. As such, FIG. 2 only shows a radius of the lock clutch and the engine brake friction clutch 86, and does not show their full diameter. The brake outer diameter 94 of the engine brake friction clutch 86 is less than the lock-up outer diameter 92 of the lock-up clutch 54. However, in other embodiments, the brake outer diameter 94 of the engine brake friction clutch 86 may be equal to or larger than the lock-up diameter of the lock-up clutch 54.

As noted above, the engine brake friction clutch 86 is operable to communicate a braking torque between the cover 68 and the torque converter input member 72. The engine brake friction clutch 86 is controlled to an engaged position to communicate torque, i.e., the braking torque, between the torque converter input member 72 and the cover 68. The engine brake friction clutch 86 is controlled to a disengaged position to not communicate torque between the torque converter input member 72 and the cover 68.

In the exemplary embodiment described herein, the engine brake friction clutch 86 is a low pressure clutch that is operable to provide a braking torque approximately equal to or less than 50 Nm. However, it should be appreciated that the engine brake friction clutch 86 may include a clutch that is capable of communicating torque greater than the exemplary 50 Nm described in the exemplary embodiment. In comparison, the prime mover 22 may output a drive torque of approximately 350 Nm or more. It should be appreciated that the prime mover 22 may output a drive torque that is less than the exemplary 350 NM described in the exemplary embodiment. The one way clutch 82 must be capable of transmitting all of the drive torque. Accordingly, the one way clutch 82 must be capable of transmitting a much larger amount of torque than the engine brake friction clutch 86. Furthermore, because the electric device 64 may be used simultaneously with the prime mover 22, the lock-up clutch 54 must be capable of transmitting all of the drive torque from the prime mover 22, as well as all of the torque from the electric device 64. For example, the electric device 64 may be configured to apply 100 Nm or more of torque. It should be appreciated that the electric device 64 may be configured to apply less than the exemplary 100 NM of torque described in the exemplary embodiment. As such, the lock-up clutch 54 must be capable of transmitting even more torque than the one way clutch 82.

Referring to FIG. 1, the transmission 24 further includes a control system 96 that is operable to send a control signal to the engine brake friction clutch 86 to move the engine brake friction clutch 86 between its engaged position and its disengaged position. The control signal may include, but is not limited to an electric control signal, a pneumatic control signal, a hydraulic control signal, a magnetic control signal, or some other type of signal capable of controlling the engine brake friction clutch 86 between its respective engaged and disengaged positions. It should be appreciated that the type of control signal will depend upon the specific type and configuration of the engine brake friction clutch 86, and the operation thereof.

In the exemplary embodiment shown in the Figures and described herein, the control system 96 includes a hydraulic control system 96 for controlling the transmission 24. However, as noted above, the control system 96 may include some other type of system other than the exemplar hydraulic system shown and described herein.

Figure 3:
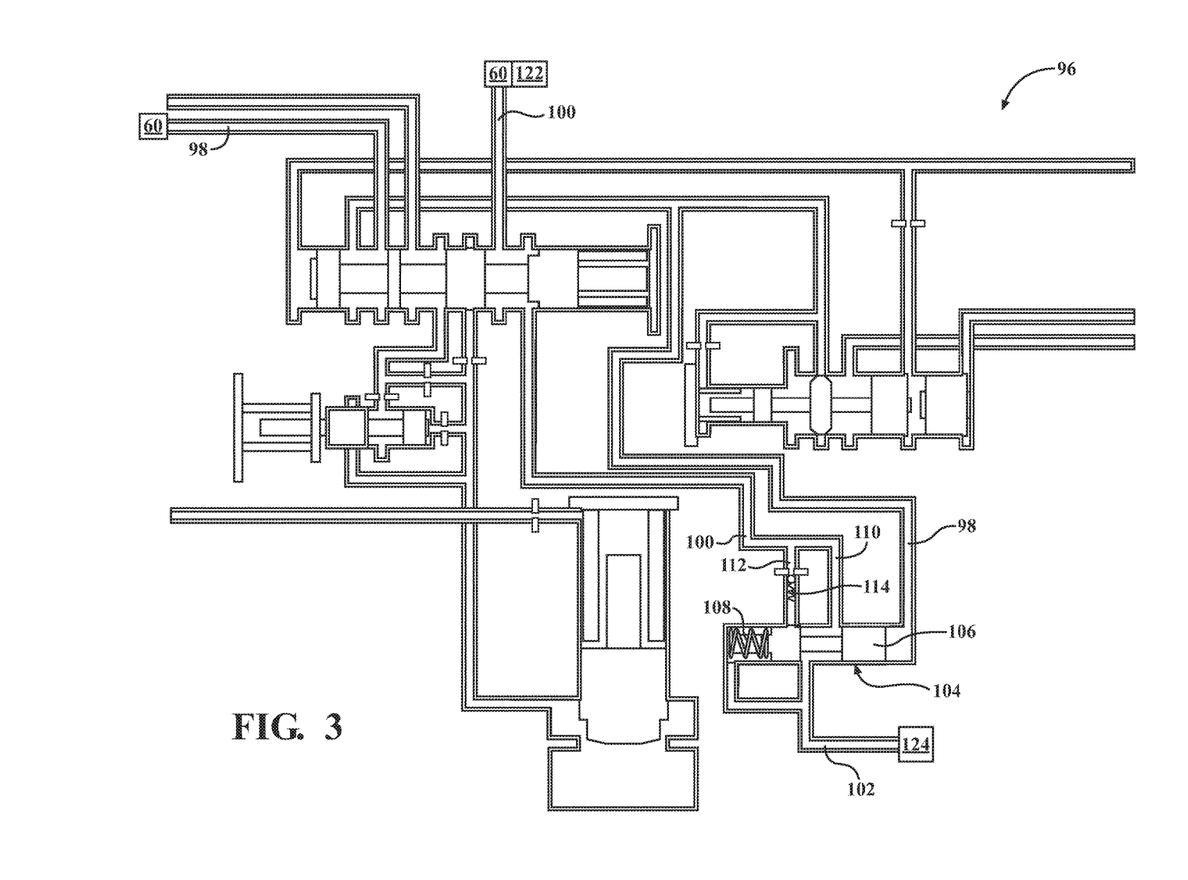
FIG. 3 is a schematic plan view of a first embodiment of a hydraulic control system for controlling the transmission.

Referring to FIG. 3, the hydraulic control system 96 includes a first fluid circuit 98, a second fluid circuit 100, and an exhaust fluid circuit 102. The first fluid circuit 98 supplies a first fluid control signal at a first fluid pressure to the apply side 60 of the lock-up clutch 54, shown in FIG. 2. The second fluid circuit 100 supplies a second fluid control signal at a second fluid pressure to the release side 62 of the lock-up clutch 54, and to the apply side 122 of the engine brake friction clutch 86, shown in FIG. 2. The exhaust fluid circuit 102 exhausts fluid from a release side 124 of the engine brake friction clutch 86, shown in FIG. 2. In the exemplary embodiment shown in the Figures and described herein, the engine brake friction clutch 86 is controlled between its engaged position and its disengaged position by the second fluid pressure of the second fluid control signal. More specifically, the operation of the engine brake friction clutch 86 is controlled by varying the first fluid pressure of the first fluid control signal and the second fluid pressure of the second fluid control signal used to control the lock-up clutch 54.

When torque is applied to the torque converter input member 72 in the first rotational direction by the drive torque from the prime mover 22, the engine brake friction clutch 86 may be controlled into the engaged position to provide the engine braking torque to the cover 68. Furthermore, when torque is applied to the pump 48 with the electric device 64, the engine brake friction clutch 86 may be controlled into the engaged position to provide the engine braking torque to the cover 68.

Referring to FIG. 2, the lock-up clutch 54 may be engaged to connect the pump 48 and the turbine 50, with the engine brake friction clutch 86 engaged to communicate torque, i.e., the braking torque, between the cover 68 of the pump 48 and the torque converter input member 72, by controlling the first fluid pressure in the first fluid circuit 98 that is applied to the apply side 60 of the lock-up clutch 54 to be greater than the second fluid pressure in the second fluid circuit 100 that is applied to the release side 62 of the lock-up clutch 54, while maintaining the second fluid pressure at a pressure that is greater than the exhaust fluid pressure. By so doing, the fluid pressure on the apply side 60 of the lock-up clutch 54 is greater than the fluid pressure on the release side 62 of the lock-up clutch 54, thereby biasing the first friction member 56 and the second friction member 58 together in frictional engagement. Further, the fluid pressure on the release side 62 of the lock-up clutch 54 is also applied to the apply side 122 of the engine brake friction clutch 86. Because the second fluid pressure on the apply side 122 of the engine brake friction clutch 86 is greater than the exhaust fluid pressure, the third friction member 88 and the fourth friction member 90 are biased together in frictional engagement.

Referring to FIG. 2, the lock-up clutch 54 may be disengaged to disconnect the pump 48 and the turbine 50, with the engine brake friction clutch 86 engaged to communicate torque, i.e., the braking torque, between the cover 68 of the pump 48 and the torque converter input member 72, by controlling the first fluid pressure in the first fluid circuit 98 that is applied to the apply side 60 of the lock-up clutch 54 to be less than the second fluid pressure in the second fluid circuit 100 that is applied to the release side 62 of the lock-up clutch 54, while maintaining the second fluid pressure at a pressure that is greater than the exhaust fluid pressure. By so doing, the fluid pressure on the apply side 60 of the lock-up clutch 54 is less than the fluid pressure on the release side 62 of the lock-up clutch 54, thereby biasing the first friction member 56 and the second friction member 58 away from each other. Further, the fluid pressure on the release side 62 of the lock-up clutch 54 is also applied to the apply side 122 of the engine brake friction clutch 86. Because the second fluid pressure on the apply side 122 of the engine brake friction clutch 86 is greater than the exhaust fluid pressure, the third friction member 88 and the fourth friction member 90 are biased together in frictional engagement.

Referring to FIG. 2, the lock-up clutch 54 may be engaged to connect the pump 48 and the turbine 50, with the engine brake friction clutch 86 disengaged to not communicate torque, i.e., the braking torque, between the cover 68 of the pump 48 and the torque converter input member 72, by controlling the first fluid pressure of the first fluid circuit 98 that is applied to the apply side 60 of the lock-up clutch 54 to be greater than the second fluid pressure of the second fluid circuit 100 that is applied to the release side 62 of the lock-up clutch 54, while connecting the second fluid control signal with the exhaust fluid circuit 102 so that the second fluid pressure is equal to the exhaust fluid pressure. By so doing, the fluid pressure on the apply side 60 of the lock-up clutch 54 is greater than the fluid pressure on the release side 62 of the lock-up clutch 54, thereby biasing the first friction member 56 and the second friction member 58 together in frictional engagement. Further, the fluid pressure on the release side 62 of the lock-up clutch 54 is also applied to the apply side 122 of the engine brake friction clutch 86. However, because the second fluid pressure on the apply side 122 of the engine brake friction clutch 86 is connected to the exhaust fluid pressure, the second fluid pressure is equal to the exhaust fluid pressure, such that the third friction member 88 and the fourth friction member 90 are not biased together in frictional engagement.

The hydraulic control system 96 may be configured in any suitable manner to control the fluid pressure in the first fluid circuit 98 and the second fluid circuit 100. For example, referring to FIG. 3, the hydraulic control system 96 includes an engine brake control valve 104. The engine brake control valve 104 is a two position valve, having a spool 106 moveable between a first position, shown in FIG. 3, and a second position (not shown). The engine brake control valve 104 shown in FIG. 3 includes a biasing device 108 e.g., a spring, which biases the spool 106 into the first position. A first side of the spool 106 is connected to the first fluid circuit 98, and is therefore subject to the first fluid pressure in the first fluid circuit 98. The first fluid pressure biases against the biasing device 108 without compressing the biasing device 108, until a pre-defined load limit is achieved, whereupon the biasing device 108 does compress and the first fluid pressure moves the spool 106 valve to the second position, which would be to the left of the position shown in FIG. 3. The engine brake control valve 104 includes a first release port 110 and a second release port 112 that are each connected to the second fluid circuit 100, and are subject to the second fluid pressure. When the spool 106 is disposed in the first position, the fluid in the first release port 110 is connected to the exhaust circuit, thereby setting the second fluid pressure in the second fluid circuit 100 equal to the exhaust fluid pressure. When the spool 106 is moved into the second position, the first release port 110 is blocked and the second release port 112 is opened. The second release port 112 includes a pressure regulator 114, e.g., a line blow-off valve, which only opens and allows fluid flow through the second release port 112 when fluid pressure in the second fluid circuit 100 is greater than a pre-defined limit, e.g., a line blow-off pressure. The pressure regulator 114 maintains the second fluid pressure within the second fluid circuit 100 at the pre-defined limit. Accordingly, if the pre-defined limit is greater than the exhaust fluid pressure in the exhaust fluid circuit 102, then the fluid pressure in the second fluid circuit 100 will be greater than the fluid pressure in the exhaust fluid circuit 102. The engine brake control valve 104 shown in FIG. 3 is a passive control system 96, which automatically controls the operation of the engine brake friction clutch 86 based on the first fluid pressure and the second fluid pressure.

Figure 4:
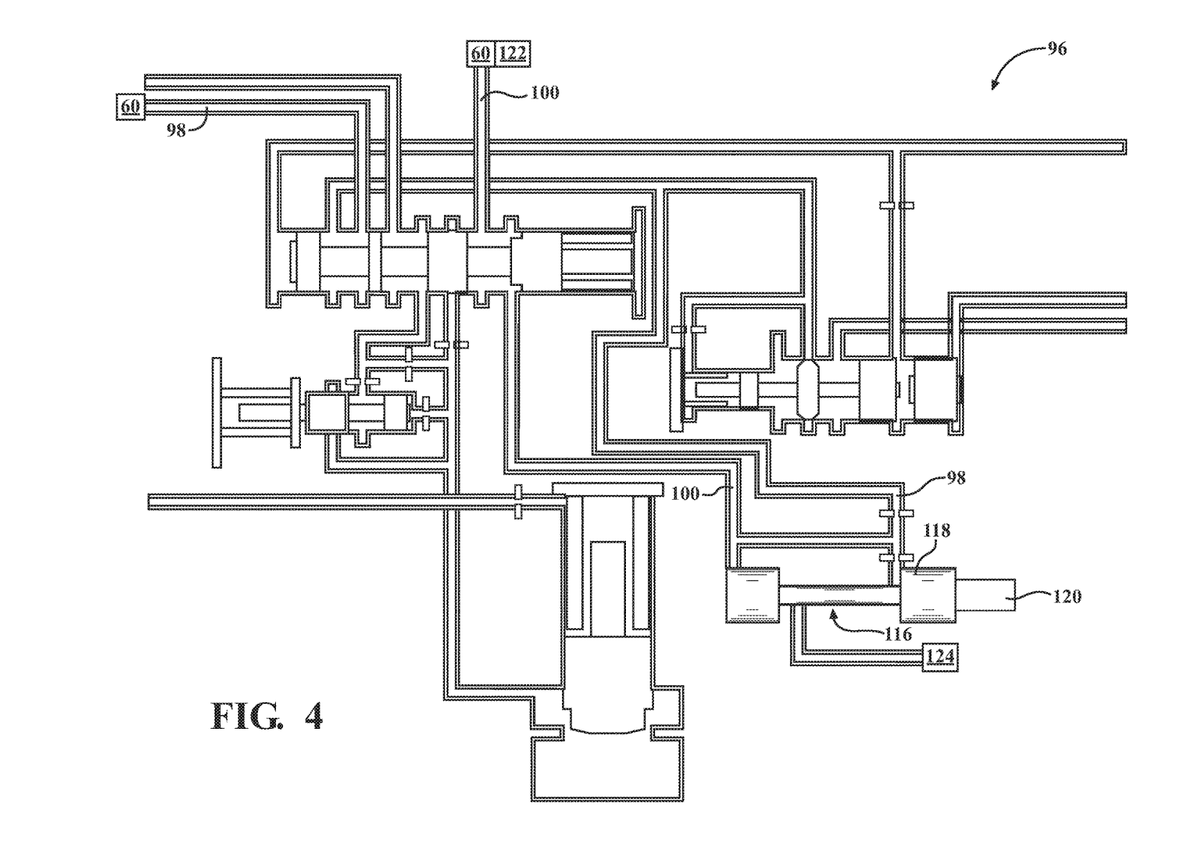
FIG. 4 is a schematic plan view of a second embodiment of the hydraulic control system for controlling the transmission.

Referring to FIG. 4, and alternative embodiment of the engine brake control valve 116 is shown. The engine brake control valve 116 includes an actively controlled spool 118, which is moveable to an infinite number of positions between a first position and a second position. The engine brake control valve 116 includes an actuator 120, such as a solenoid, which is connected to and actively controlled to move the spool 118. By moving the spool 118 back and forth, the second fluid pressure in the second fluid circuit 100 is controlled to be a percentage of the first fluid pressure in the first fluid circuit 98. In order to increase the second fluid pressure, the actuator 120 moves the spool 118 to the right of the page as shown in FIG. 4, thereby increasing the opening size to the first fluid circuit 98, which increases the second fluid pressure proportionally. In order to decrease the second fluid pressure, the actuator 120 moves the spool 118 to the left of the page as shown in FIG. 4, thereby decreasing the opening size to the first fluid circuit 98, which decreases the second fluid pressure proportionally.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A transmission comprising:
a housing;
a transmission input member rotatably supported by the housing;
a torque converter having a pump and a turbine, wherein the turbine is connected to the transmission input member for transferring torque therebetween;
a cover connected to and rotatable with the pump and at least partially defining an interior of the torque converter;
a torque converter input member passing through the cover and configured for attachment to a crankshaft of an engine;
a one way clutch selectively interconnecting the torque converter input member and the cover; and
an engine brake friction clutch disposed within the interior of the torque converter, and selectively interconnecting the torque converter input member and the cover in torque communication.

2. The transmission set forth in claim 1, wherein the engine brake friction clutch is controlled to an engaged position to communicate torque between the torque converter input member and the cover, and wherein the engine brake friction clutch is controlled to a disengaged position to disconnect torque communication between the torque converter input member and the cover.

3. The transmission set forth in claim 1, further comprising a lock-up clutch selectively operable to connect the pump and the turbine for rotation together without relative slippage therebetween.

4. The transmission set forth in claim 1, further comprising a seal disposed between and in sealing engagement with the cover and the torque converter input member.

5. The transmission set forth in claim 1, further comprising a bushing disposed between the cover and the torque converter input member, and radially supporting the cover relative to the torque converter input member.

6. The transmission set forth in claim 1, wherein the one way clutch is operable to communicate a drive torque from an engine between the torque converter input member and the cover, and wherein the engine brake friction clutch is operable to communicate a braking torque between the cover and the torque converter input member.

7. The transmission set forth in claim 1, further comprising an electric device coupled to the pump and operable to supply torque to the pump.

8. The transmission set forth in claim 2, further comprising a control system operable to send a control signal to the engine brake friction clutch to move the engine brake friction clutch between its engaged position and its disengaged position.

9. The transmission set forth in claim 8, wherein the control system includes a hydraulic control system for controlling the transmission, the hydraulic control system including:
a first fluid circuit for supplying a first fluid control signal at a first fluid pressure to an apply side of the lock-up clutch;
a second fluid circuit for supplying a second fluid control signal at a second fluid pressure to a release side of the lock-up clutch and to an apply side of the engine brake friction clutch; and
an exhaust fluid circuit for exhausting fluid from a release side of the engine brake friction clutch;
wherein the engine brake friction clutch is controlled between its engaged position and its disengaged position by the second fluid pressure of the second fluid control signal.

10. The transmission set forth in claim 1, wherein the one way clutch is operable to communicate torque between the torque converter input member and the cover in a first rotational direction without slippage therebetween, and wherein the one way clutch is operable to disconnect torque communication between the torque converter input member and the cover in a second rotational direction, opposite the first rotational direction.

11. The transmission set forth in claim 1, wherein the one way clutch is disposed within the interior of the torque converter.

12. A transmission for a hybrid vehicle, the transmission comprising:
a housing;
a transmission input member rotatably supported by the housing;
a torque converter having a pump and a turbine, wherein the turbine is connected to the transmission input member for transferring torque therebetween;
a lock-up clutch selectively operable to connect the pump and the turbine for rotation together;
a cover connected to and rotatable with the pump and at least partially defining an interior of the torque converter;
a torque converter input member passing through the cover and configured for attachment to a crankshaft of an engine;
a one way clutch disposed within the interior of the torque converter and interconnecting the torque converter input member and the cover, wherein the one way clutch is operable to communicate a drive torque from an engine between the torque converter input member and the cover, and wherein the engine brake friction clutch is operable to communicate a braking torque between the cover and the torque converter input member;
an engine brake friction clutch disposed within the interior of the torque converter, and selectively interconnecting the torque converter input member and the cover in torque communication, wherein the engine brake friction clutch is controlled to an engaged position to communicate torque between the torque converter input member and the cover, and wherein the engine brake friction clutch is controlled to a disengaged position to disconnect torque communication between the torque converter input member and the cover;
an electric device coupled to the pump and operable to supply torque to the pump; and
a control system operable to send a control signal to the engine brake friction clutch to move the engine brake friction clutch between its engaged position and its disengaged position, wherein the control system includes:
a first fluid circuit for supplying a first fluid control signal at a first fluid pressure to an apply side of the lock-up clutch;

a second fluid circuit for supplying a second fluid control signal at a second fluid pressure to a release side of the lock-up clutch and to an apply side of the engine brake friction clutch;

an exhaust fluid circuit for exhausting fluid from a release side of the engine brake friction clutch; and wherein the engine brake friction clutch is controlled between its engaged position and its disengaged position by the second fluid pressure of the second fluid control signal.

13. A method of controlling a transmission of a hybrid vehicle, the transmission including a torque converter having a pump and a turbine, a torque converter input member connected to a crankshaft of an engine and passing through a cover of the pump into an interior of the torque converter, a lock-up clutch selectively interconnecting the pump and the turbine, and an engine brake friction clutch disposed within the interior of the torque converter and selectively interconnecting the cover and the torque converter input member, the method comprising:

providing a hydraulic control system for controlling the transmission, the hydraulic control system including:

a first fluid circuit for supplying a first fluid control signal to an apply side of the lock-up clutch at a first fluid pressure, a second fluid circuit for supplying a second fluid control signal to a release side of the lock-up clutch and an apply side of the engine brake friction clutch at a second fluid pressure;

an exhaust fluid circuit for exhausting fluid from a release side of the engine brake friction clutch at an exhaust fluid pressure; and controlling the operation of the engine brake friction clutch by varying the first fluid pressure of the first fluid control signal and the second fluid pressure of the second fluid control signal used to control the lock-up clutch.

14. The method set forth in claim 13, wherein controlling the operation of the engine brake friction clutch includes controlling the first fluid pressure to be greater than the second fluid pressure, while maintaining the second fluid pressure at a fluid pressure that is greater than the exhaust fluid pressure, such that the lock-up clutch is engaged to connect the pump and the turbine and the engine brake friction clutch is engaged to communicate torque between the cover of the pump and the torque converter input member.

15. The method set forth in claim 13, wherein controlling the operation of the engine brake friction clutch includes controlling the first fluid pressure to be less than the second fluid pressure, such that the lock-up clutch is disengaged to disconnect the pump and the turbine and the engine brake friction clutch is engaged to communicate torque between the cover of the pump and the torque converter input member.

16. The method set forth in claim 13, wherein controlling the operation of the engine brake friction clutch includes controlling the first fluid pressure to be greater than the second fluid pressure, and connecting the second fluid control signal with the exhaust fluid circuit so that the second fluid pressure is equal to the exhaust fluid pressure, such that the lock-up clutch is engaged to connect the pump and the turbine and the engine brake friction clutch is disengaged to not communicate torque between the cover of the pump and the torque converter input member.

17. The method set forth in claim 13, wherein the transmission includes a one way clutch interconnecting the cover of the pump and the torque converter input member for communicating torque therebetween in a first rotational direction and not communication torque therebetween in a second rotational direction, and wherein the method further comprises controlling the engine brake friction clutch into an engaged position to provide an engine braking torque to the cover when torque is applied to the torque converter input member in the second rotational direction.

18. The method set forth in claim 13, wherein the transmission includes an electric device connected to the pump of the torque converter and operable to apply torque to the pump, and wherein the method further comprises controlling the engine brake friction clutch into an engaged position to provide an engine braking torque to the cover when torque is applied to the pump with the electric device.

19. The method set forth in claim 13, wherein the transmission includes an electric device connected to the pump of the torque converter and operable to apply torque to the pump, and wherein the method further comprises controlling the engine brake friction clutch into a disengaged position to disconnect torque communication between the pump and the cover when torque is applied to the pump with the electric device.

* * * * *